(12) United States Patent
Alacqua et al.

(10) Patent No.: US 7,793,497 B2
(45) Date of Patent: Sep. 14, 2010

(54) ACTUATOR WITH A WOUND SHAPE-MEMORY ELEMENT

(75) Inventors: Stefano Alacqua, Rivoli Cascine Vica (IT); Gianluca Capretti, Orbassano (IT); Marco Biasiotto, Turin (IT); Alessandro Zanella, Turin (IT)

(73) Assignee: C.R.F. Società Consortile per Azioni, Turin (IT)

( * ) Notice: Subject to any disclaimer, the term of this patent is extended or adjusted under 35 U.S.C. 154(b) by 362 days.

(21) Appl. No.: 11/711,794

(22) Filed: Feb. 28, 2007

(65) Prior Publication Data

US 2007/0204613 A1    Sep. 6, 2007

(30) Foreign Application Priority Data

Mar. 1, 2006  (EP) .................................. 06425135

(51) Int. Cl.
*F01B 29/10* (2006.01)
*F02G 1/04* (2006.01)
(52) U.S. Cl. .............................. 60/527; 60/529; 185/37; 185/45
(58) Field of Classification Search ........... 60/527–529; 185/37, 45
See application file for complete search history.

(56) References Cited

U.S. PATENT DOCUMENTS

| | | | | |
|---|---|---|---|---|
| 3,720,107 A | * | 3/1973 | Shepard | 60/529 |
| 4,761,955 A | * | 8/1988 | Bloch | 60/528 |
| 5,396,769 A | | 3/1995 | Brudnicki | |
| 5,996,346 A | * | 12/1999 | Maynard | 60/527 |
| 6,006,522 A | | 12/1999 | Foss, Jr. et al. | |
| 2005/0103008 A1 | | 5/2005 | Gummin et al. | |

FOREIGN PATENT DOCUMENTS

EP     1 073 081 A2    6/2000

* cited by examiner

*Primary Examiner*—Thomas E Denion
*Assistant Examiner*—Jesse Bogue
(74) *Attorney, Agent, or Firm*—Nixon & Vanderhye P.C.

(57) ABSTRACT

An actuator comprises an elongated shape-memory element wound around a first element and having one first end connected to the first element and one second end connected to a second element. Heating means are provided for heating the shape-memory element in order to obtain a displacement of one of the ends thereof. The elongated shape-memory element is guided so that it can slide within a closed channel made of a material having a low coefficient of friction, for example defined by a sheath.

3 Claims, 5 Drawing Sheets

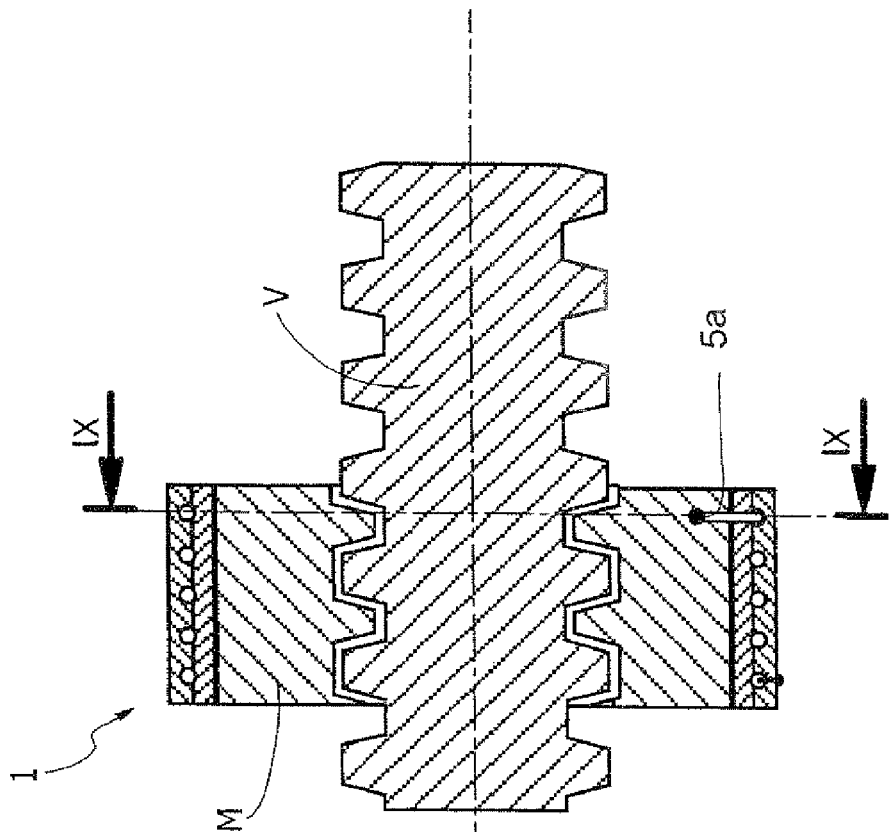
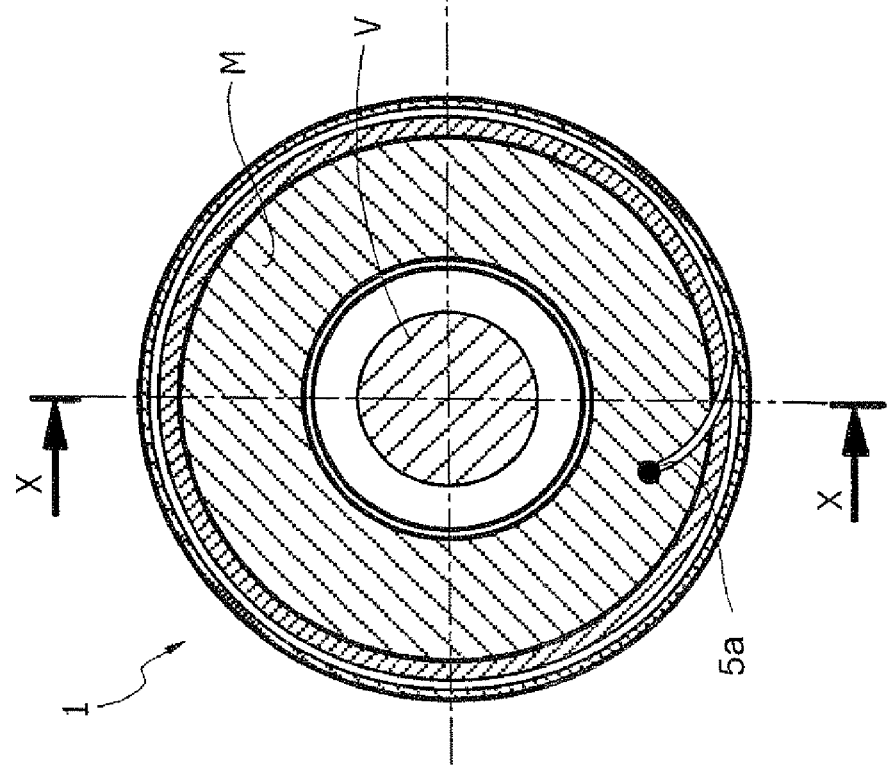

ACTUATOR WITH A WOUND SHAPE-MEMORY ELEMENT

BACKGROUND OF THE INVENTION

The present invention relates to the field of actuators designed to displace an object from a first position as far as at least one second position, and that have a shape-memory element.

Shape-memory-actuator (SMA) elements have been known for some time and used in wide range of fields. They use shape-memory metal alloys capable of undergoing deformation when a pre-set transition temperature is exceeded. In general, heating can be obtained in so far as the SMA element detects directly a variable temperature, or else by supplying an electric current through the SMA element so as to heat it by the Joule effect.

One of the applications of shape-memory elements is in actuators.

The U.S. Pat. No. 6,006,522 describes an actuator that includes a strip made of a shape-memory material, arranged around a fixed element and connected to an object, in such a way that, when the shape-memory element is activated by means of a heating element, the martensitic/austenitic transformation causes displacement of the aforesaid object. Said transformation leads to a slight shortening of the strip. The latter, however, is not free to slide in so far as it is in frictional contact with the aforesaid heating element so that the turns of the strip are subjected to a radial movement towards the outside and to a circumferential movement.

Consequently, in this type of known actuator the effective displacement of the object is not caused by the variation in the length of the shape-memory strip but by the increase in the radius of its turns. Consequently, the control performed by this actuator will prove far from precise and difficult to calibrate as a function of the temperature reached by the shape-memory element itself. In addition, for proper operation of this type of actuator, the space inside the casing that encloses it will have to be such as to enable the necessary expansion.

The U.S. Pat. No. 5,396,769 shows an actuator that has an elongated SMA element wound in a helix on an element that is free to rotate. In this case, the displacement governed by the actuator depends directly upon the variation in length of the SMA element. However, the variation in length of the SMA element is countered by the friction that acts between the surfaces of the turns mutually in contact.

In addition to preventing shortening of the SMA element, friction can also generate a radial and circumferential movement outwards (as in the previous case), which albeit leading to the effective displacement of the object moved by the actuator, leads to an operation that is far from precise and in this case undesirable.

The above drawback is intrinsic in the windings of shape-memory elements in so far as the presence of friction, both between the SMA element and the surface on which it is wound and between the various portions of surface of the SMA element, creates a field of forces that tend to slacken and even modify the winding of the SMA element.

SUMMARY OF THE INVENTION

The purpose of the present invention is to solve the problems and the disadvantages of the solutions of the known art. With a view to achieving said purpose, forming the subject of the invention is an actuator for displacing at least one first object from a first position as far as at least one second position. Said actuator comprises:

a first fixed element;

an elongated SMA element wound around said first fixed element, said elongated SMA element having a first end connected to said first fixed element and a second end connected to said first object; and heating means for heating said elongated SMA element in order to obtain a transformation from a martensitic phase into an austenitic phase and to bring about displacement of said second end of said elongated SMA element.

Said actuator is characterized in that said elongated SMA element is guided so that it can slide within a closed channel made of a material having a low coefficient of friction, which is fixed with respect to the first element and has a helical or spiral development. In one embodiment said closed channel is defined by a sheath made of a material having a low coefficient of friction.

In the actuator according to the invention, when the shape-memory element is heated and undergoes the martensitic/austenitic transformation that causes a decrease in the length of the shape-memory element, this will be free to slide within the sheath, and the movement of the object connected thereto will depend directly upon the variation in the principal dimension of the SMA element. In this way, there is the advantage of having an actuator that is very precise, easy to calibrate, and that can be regulated as a function of the temperature.

A further way of varying the range of displacement provided by the actuator is that of varying the number of turns in so far as the increase in the number of turns is equivalent to an increase of the total length of the shape-memory element and, since the deformation caused by the martensitic/austenitic transformation is directly proportional to the initial length of the shape-memory element, said deformation will be greater, and consequently the displacement caused by the actuator will be likewise greater. In the known art, the increase in the number of turns was not equally effective. In fact, in the first case (U.S. Pat. No. 6,006,522) the displacement is for the most part caused by the increase in the radius of the turns of the winding and consequently a higher number of turns inside one and the same casing limits the possibility of expansion outwards of the turns themselves.

In the second case (U.S. Pat. No. 5,396,769), instead, the presence of friction can cause the effective phase transformation to occur only at the ends (where the field of the forces of friction is smaller) and hence the greater initial length becomes of no effect.

In the solution proposed by the present invention, instead, a higher number of turns will result directly in a greater actuation stroke, without the turns hindering one another, thanks to the function of spacer and guide afforded by the sheath. An actuator will consequently be obtained which can perform extensive actuation strokes whilst occupying a relatively limited space.

BRIEF DESCRIPTION OF THE DRAWINGS

The present invention will now be described in detail with reference to the attached plate of drawings, which are provided purely by way of non-limiting example, and in which:

FIG. 9 represents a cross-sectional view according to the line IX-IX of FIG. 10 of the actuator applied to an internal thread that actuates a wormscrew, the actuator being in a first position;

FIG. 10 represents a cross-sectional view according to the line X-X of FIG. 9;

DETAILED DESCRIPTION OF THE INVENTION

Figure 1:
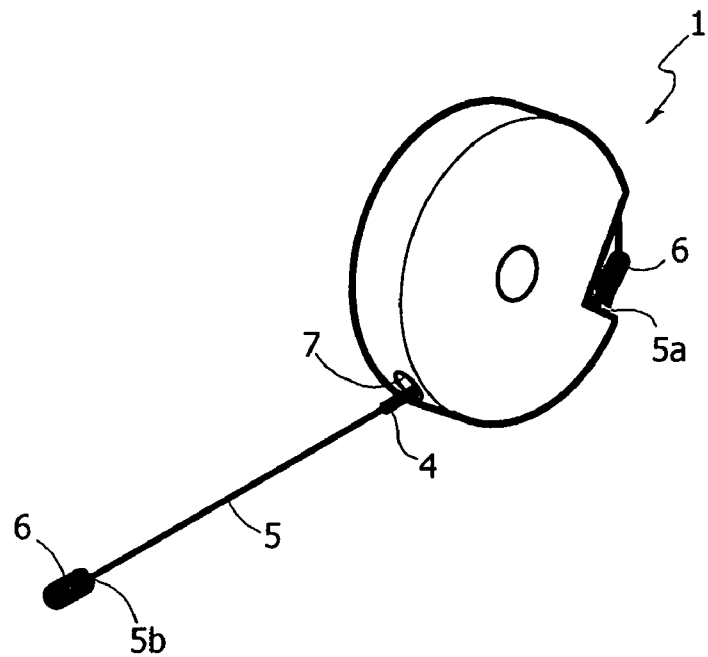
FIG. 1 is a schematic perspective view of the actuator according to the invention in a first end position of its actuation stroke.
Figure 2:
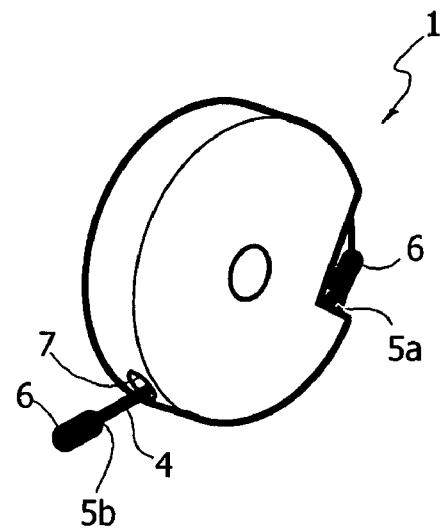
FIG. 2 is a schematic perspective view of the actuator according to the invention in a second end position of its actuation stroke.

With reference to FIG. 1, number 1 designates an actuator designed to displace an object (not illustrated) from a first position as far as at least one second position.

Figure 3:
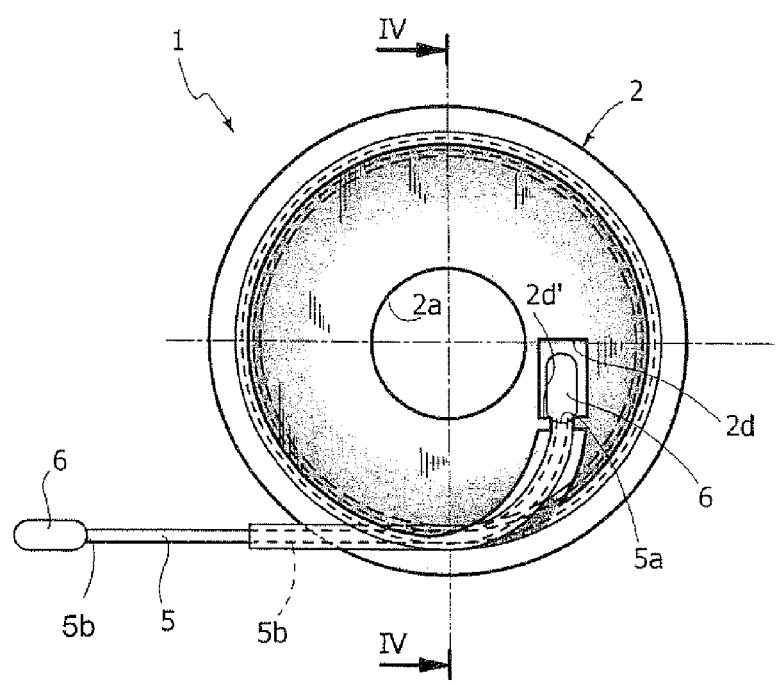
FIG. 3 is a front view of a first embodiment of the actuator according to the invention.
Figure 4:
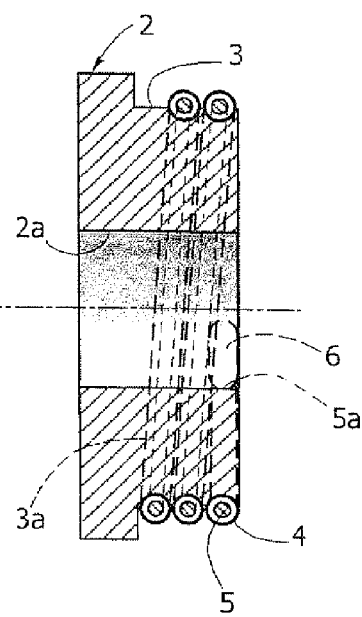
FIG. 4 is a cross-sectional side view of the actuator according to the line IV-IV of FIG. 3.
Figure 5:
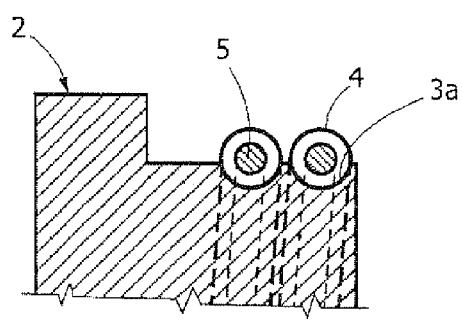
FIG. 5 represents, at an enlarged scale, a portion of the cross section of FIG. 4.

In the embodiment illustrated specifically in FIGS. 3 to 5, the actuator 1 comprises an element 2 having a disk-shaped body, made of a plastic or metal material, with a circular outer side surface 3 on which a groove 3a is made, which extends to form a helix throughout the development of the surface 3.

The element 2 has a central hole 2a designed for coupling of said element to a fixed structure (not shown).

Wound around the side surface 3 of the element 2 is a sheath 4, for example made of a plastic material having a low coefficient of friction, such as PTFE, which follows the line of winding of the groove 3a within which the sheath 4 is placed, the groove 3a constituting a seat for said sheath. Inserted inside the sheath 4 is an elongated element made of a shape-memory material (SMA) 5, for example in the form of a wire with a circular cross section or of a strip with a flattened cross section (in which case the sheath 4 will have a corresponding cross section).

The elongated SMA element 5 has a first end 5a constrained to the element 2 and a second end 5b connected to an object which is displaceable via the actuator 1. Made on the front face of the element 2 is a groove 2d designed to receive the end 5a of the SMA element. Said groove 2d gives out onto the side surface 3 to enable the SMA element to wind on said surface.

The sheath 4 coats the elongated SMA element 5 substantially at least throughout the length along which the elongated SMA element 5 is wound on the element 2. The ends 5a, 5b of the elongated SMA element 5 have two terminals 6 for electrical connection to an electrical-supply source (not shown) that can be used for causing the SMA element 5 to be traversed by an electric current.

The terminal 6 of the end 5a is such as to constitute an anchorage element for the end 5a in so far as it bears upon the wall 2d' of the groove 2d traversed by the SMA element 5 whenever it is subjected to a tensile force as a result of activation of the SMA element 5.

The current that traverses the SMA element 5 is designed to heat the SMA element itself in order to bring about the martensitic/austenitic transformation.

Figure 6:
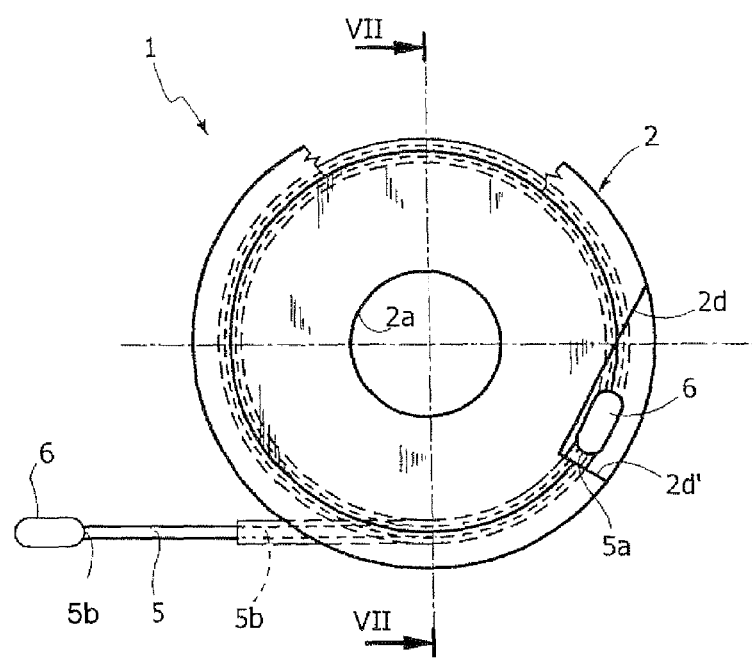
FIG. 6 is a front view of a second embodiment of the actuator.
Figure 7:
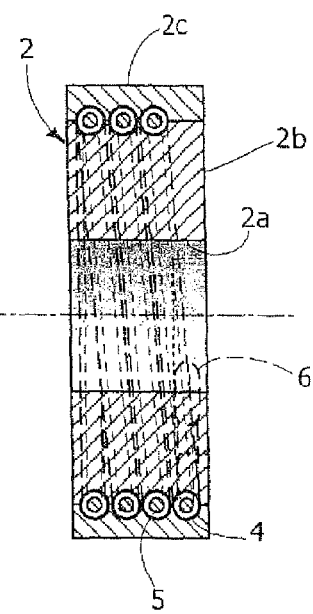
FIG. 7 is a cross-sectional side view of the variant of FIG. 6, according to the line VII-VII of FIG. 6.
Figure 8:
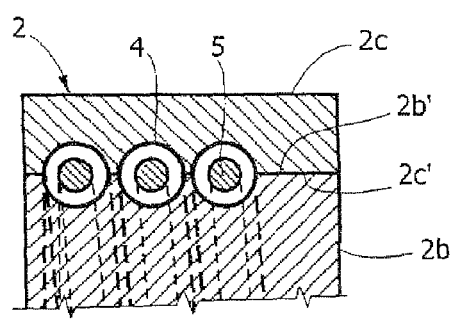
FIG. 8 represents, at an enlarged scale, a portion of the cross section of FIG. 7.

FIGS. 6 to 8 show a variant of the embodiment of FIG. 3 in which the element 2 is made up of two ring-shaped blocks 2c, 2b having dimensions such that the radius of the inner circumference 2c' of the block 2c corresponds to the radius of the outer circumference 2b' of the block 2b, rendering these two blocks concentrically coupleable to one another. The inner surface of the block 2c and the outer surface of the block 2b present helical grooves, which, when the two blocks are coupled together, constitute as a whole a helical passage within which the sheath 4 and the SMA element 5 are inserted.

Said passage gives out onto the outer side surface of the element 2 through a hole 7, through which the SMA element prolongs outside the element 2 with its end 5b.

When the power source is activated and the current traverses the SMA element, this starts to heat up by the Joule effect. Once it has reached a temperature higher than that of transition into the austenitic phase, the SMA element 5 starts shortening. At this point, the SMA element 5 slides inside the sheath and in this way pulls the end 5b connected to the object towards the winding element 2.

According to a variant, it is envisaged to mould two half-shells made of a material having a low coefficient of friction (PTFE) on the two inner surfaces 2b' and 2c' in such a way that the coupling of the two blocks 2b and 2c will form a closed channel having a low coefficient of friction where an SMA element 5 can slide without any sheath.

Alternatively, the block 2c itself can be made of a material having a low coefficient of friction (PTFE). This will enable an SMA element 5 to slide in the channel formed by the coupling with the block 2b without any sheath.

FIGS. 9 to 12 show an application of the actuator 1.

Figure 12:
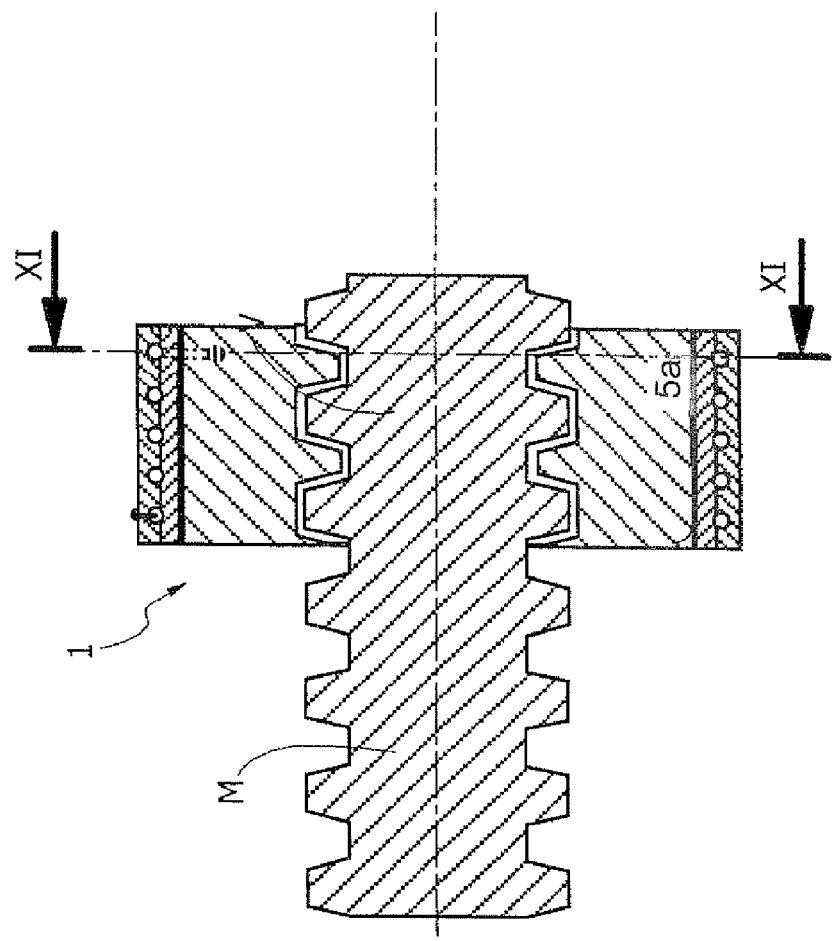
FIG. 12 represents a cross-sectional view according to the line XII-XII of FIG. 11.
Figure 11:
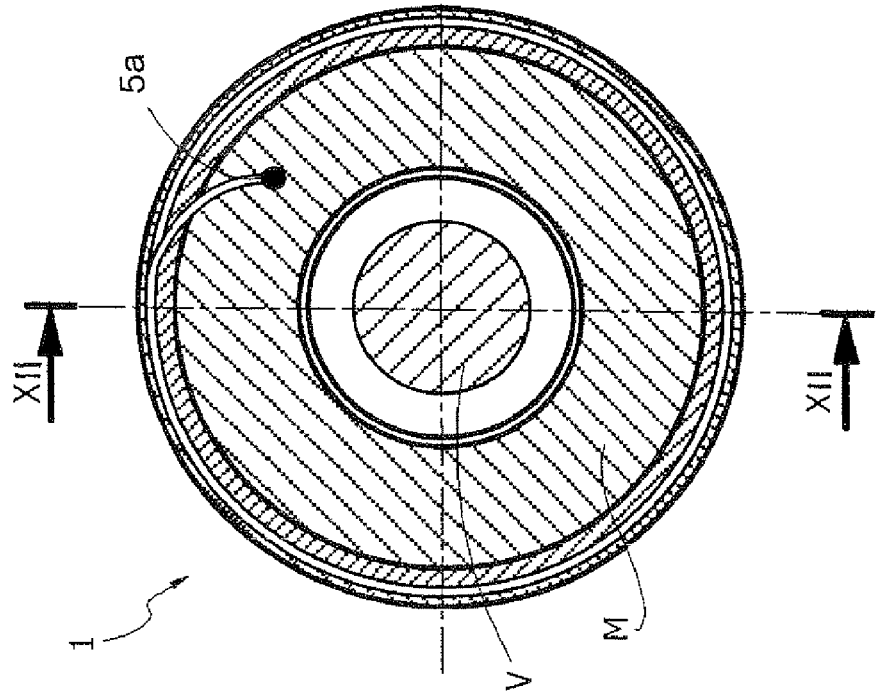
FIG. 11 represents the application of FIG. 9, in a cross-sectional view according to the line XI-XI of FIG. 12, the actuator being in a second position.

The actuator 1 is mounted on an internal thread M designed to actuate a wormscrew V. The element 2 is connected to a fixed structure (not shown), and the end 5a of the SMA element is connected to the internal thread M. Activation of the power source (not shown) cause passage of a current through the SMA element 5, thus heating it. If temperatures above the austenitic temperature are reached, the martensitic/austenitic transition starts which causes a shortening of the SMA element 5. This shortening causes a sliding of the SMA element within the sheath and a consequent displacement of the end 5b in the circumferential clockwise direction, thus drawing in rotation the internal thread, which in turn actuates the wormscrew (FIG. 12).

Elastic means (not illustrated) may be associated to the internal thread M to recall the internal thread into the starting position after de-activation of the actuator. Alternatively, two shape-memory wires may be provided wound with opposite helices on the internal thread for controlling the movement respectively in one direction and in the other.

In addition to a winding of a helical type of the SMA element on the supporting element 2, a spiral winding may be provided, in which all the turns lie on one and the same plane, each subsequent turn setting itself around the preceding one. Also in this case the sheath has the function of spacer and guide for the SMA element 5.

Of course, the actuator according to the invention is of general application and enables particular advantages to be achieved above all in those applications where a relatively extensive actuation stroke is required, along with relatively small overall dimensions of the actuator.

Of course, without prejudice to the principle of the invention, the details of construction and the embodiments may vary widely with respect to what is described and illustrated herein, without thereby departing from the scope of the present invention.

What is claimed is:

1. A system comprising a first element (2), a second element and an actuator for causing a variation in the position of said first element (2) relative to said second element, between a first position and at least a second position, said actuator comprising:
- an elongated shape memory element (5) wound around said first element (2), said elongated shape memory element (5) having a first end (5a) connected to said first element (2) and a second end (5b) connected to said second element; and
- heating means for heating said elongated shape memory element (5) in order to obtain a transformation from a martensitic phase into an austenitic phase and to bring about displacement of one of said ends (5a, 5b) of said elongated shape memory element (5), and wherein:
said heating means include an electrical-supply source and electrical-conduction terminals (6) for conducting a current through said SMA element (5),
said elongated shape memory element (5) is guided so that it can slide within a closed channel (4; 2b, 2c) made of a material having a low coefficient of friction, which is fixed with respect to the first element and has a helical or spiral development,
said first element (2) is made up of two ring-shaped blocks (2c, 2b) which are coupled concentrically one inside the other,
the inner surface (2c') of the outer block (2c) and the outer surface (2b') of the inner block (2b) have helical grooves which, when the two blocks are coupled, constitute as a whole a closed helical passage within which the SMA element is arranged, wherein the closed helical passage is defined between two concentric rings having helical grooves facing each other,
wherein said elongated shape memory element (5) is guided within the aforesaid helical passage with interposition of a sheath (4) placed within the aforesaid closed channel and in that the actuator further comprises return means for recalling said first element (2) and said second element into said first relative position, said return means being formed by elastic elements.

2. The system according to claim 1, wherein said shape memory element (5) is in the form of a wire with a circular cross section.

3. The system according to claim 1, wherein said shape memory element (5) is in the form of a strip with a flattened cross section.

* * * * *